US012322350B2

(12) United States Patent
Kim et al.

(10) Patent No.: US 12,322,350 B2
(45) Date of Patent: Jun. 3, 2025

(54) BACKLIGHT DEVICE FOR DISPLAY AND CURRENT CONTROL INTEGRATED CIRCUIT THEREOF

(71) Applicant: GLOBAL TECHNOLOGIES CO., LTD, Hwaseong-si (KR)

(72) Inventors: Yong Geun Kim, Suwon-si (KR); Min Seon Kim, Hwaseong-si (KR)

(73) Assignee: GLOBAL TECHNOLOGIES CO., LTD, Hwaseong-si (KR)

( * ) Notice: Subject to any disclaimer, the term of this patent is extended or adjusted under 35 U.S.C. 154(b) by 0 days.

(21) Appl. No.: 18/294,973

(22) PCT Filed: Jul. 7, 2022

(86) PCT No.: PCT/KR2022/009834

§ 371 (c)(1),
(2) Date: Feb. 2, 2024

(87) PCT Pub. No.: WO2023/013902

PCT Pub. Date: Feb. 9, 2023

(65) Prior Publication Data

US 2024/0249692 A1 Jul. 25, 2024

(30) Foreign Application Priority Data

Aug. 4, 2021 (KR) ........................ 10-2021-0102635

(51) Int. Cl.
*G09G 3/34* (2006.01)
*G09G 3/20* (2006.01)
(Continued)

(52) U.S. Cl.
CPC ......... *G09G 3/3426* (2013.01); *G09G 3/2088* (2013.01); *G09G 3/3406* (2013.01);
(Continued)

(58) Field of Classification Search
CPC ........ G09G 3/34; G09G 3/3406; G09G 3/342; G09G 3/3426; G09G 2310/0272;
(Continued)

(56) References Cited

U.S. PATENT DOCUMENTS

2008/0143757 A1 6/2008 Furihata et al.
2017/0061901 A1* 3/2017 Zhang .................. G09G 3/3426
(Continued)

FOREIGN PATENT DOCUMENTS

KR 10-2008-0055704 6/2008
KR 10-1277333 6/2013
(Continued)

OTHER PUBLICATIONS

International Search Report, with English translation, corresponding to International Application No. PCT/KR2022/009834, dated Oct. 7, 2022.
(Continued)

*Primary Examiner* — Julie Anne Watko
(74) *Attorney, Agent, or Firm* — KILE PARK REED & HOUTTEMAN PLLC

(57) ABSTRACT

Proposed are a backlight device for display and a current control integrated circuit therefor, the current control integrated circuit includes a plurality of driving current control units sharing a column signal for backlight and controlling driving currents of a predetermined number of light-emitting diode channels belonging to the same control group, wherein the plurality of the driving current control units receive the column signal for the control group and the zoom control signal in a shared manner and sequentially receive row signals, respectively, and wherein each of the plurality of driving current control units generates the sampling voltage that results from sampling the column signal using the row signal, and controls the driving current for light
(Continued)

emission from the light-emitting diode channel using the sampling voltage, thereby enabling a gain for conversion of the driving current by the sampling voltage to be controlled with the zoom control signal.

19 Claims, 11 Drawing Sheets

(51) Int. Cl.

| | |
|---|---|
| ***G09G 3/36*** | (2006.01) |
| ***H05B 45/345*** | (2020.01) |
| *G09G 3/32* | (2016.01) |

(52) U.S. Cl.
CPC ........... *G09G 3/342* (2013.01); *G09G 3/3648* (2013.01); *H05B 45/345* (2020.01); *G09G 3/32* (2013.01); *G09G 2310/0294* (2013.01); *G09G 2320/0247* (2013.01)

(58) Field of Classification Search
CPC ... G09G 2310/0294; G09G 2320/0247; G09G 3/2088; G09G 3/32; G09G 3/3648; H05B 45/345
See application file for complete search history.

(56) References Cited

U.S. PATENT DOCUMENTS

| | | | | |
|---|---|---|---|---|
| 2017/0110064 | A1* | 4/2017 | Zhang | G09G 3/3406 |
| 2021/0165277 | A1 | 6/2021 | Park et al. | |
| 2021/0398499 | A1* | 12/2021 | Kim | G09G 3/36 |
| 2022/0270562 | A1 | 8/2022 | Jung et al. | |

FOREIGN PATENT DOCUMENTS

| | | |
|---|---|---|
| KR | 10-2021-0057417 | 5/2021 |
| KR | 10-2021-0066224 | 6/2021 |
| KR | 10-2271828 | 7/2021 |

OTHER PUBLICATIONS

Written Opinion, with English translation, corresponding to International Application No. PCT/KR2022/009834, dated Oct. 7, 2022.

* cited by examiner

| | D1 | D2 | D3 | D4 |
|---|---|---|---|---|
| G1 | CH11<br>CZ=L | CH12<br>CZ=L | CH13<br>CZ=L | CH14<br>CZ=L |
| G2 | CH21<br>CZ=H | CH22<br>CZ=H | CH23<br>CZ=H | CH24<br>CZ=H |
| G3 | CH31<br>CZ=H | CH32<br>CZ=H | CH33<br>CZ=H | CH34<br>CZ=H |
| G4 | CH41<br>CZ=L | CH42<br>CZ=L | CH43<br>CZ=L | CH44<br>CZ=L |

BACKLIGHT DEVICE FOR DISPLAY AND CURRENT CONTROL INTEGRATED CIRCUIT THEREOF

TECHNICAL FIELD

The present disclosure relates to a backlight device, and more particularly, to a backlight device for providing backlight for image display, and a current control integrated circuit for the backlight device for display.

BACKGROUND ART

Among display panels, for example, LCD panels need backlight devices for image display.

The backlight device provides backlight for displaying images on the LCD panel. The LCD panel can display the images using the backlight by performing an optical shutter operation on a per-pixel basis.

The backlight device may include a backlight board. The backlight board includes light-emitting diode channels using LEDs as light sources. The light-emitting diode channels can emit light to provide the backlight.

The backlight board includes light-emitting diode channels to realize the backlight having different resolution than an image on the LCD panel. The light emission from the light-emitting diode channels can be controlled with column signals and row signals.

The backlight device in the related art, which performs dimming control, has difficulty maintaining the light emission from the light-emitting diode channels for one frame. When the light-emitting diode channel does not maintain sufficiently the light emission for one frame, flicker may occur. Therefore, the backlight device needs to employ a design for reducing or eliminating the flicker.

In addition, for display, the backlight may be provided in such a manner as to have low luminance for a horizontal period of all frames or several frames.

In the case of the above-mentioned backlight, the recognition degree of a difference in luminance between low luminance levels is higher than that between high luminance levels. Therefore, the difference in luminance within a low gray range may appear more pronounced to a viewer.

Particularly, the above-mentioned difference in luminance at a dark gray level may appear coarse to the viewer.

Therefore, there is a requirement to develop technology capable of seamlessly representing the difference in luminance within the low gray range.

In addition, there is a need for realizing the above-mentioned multi-functions in such a manner as to provide an amount of good-quality light for the backlight to the LCD panel, as described above. For this reason, there has been a need to develop the backlight device capable of providing the multi-function to secure high reliability.

DISCLOSURE

Technical Problem

An object of the present disclosure is to provide a backlight device for display that is capable of maintaining light emission from each light emitting channel for backlight for one frame, in order to reduce or eliminate flicker, and to provide a current control integrated circuit for the backlight device for display.

Another object of the present disclosure is to provide a backlight device for display that is capable of dividing light-emitting diode channel on a backlight board into a plurality of control groups and controlling driving currents of the light-emitting diode channels on a per-control group basis, and to provide a current control integrated circuit for the backlight device for display.

Still another object of the present disclosure is to provide a backlight device for display that is capable of seamlessly representing a difference in luminance within a low gray range, such as at a dark gray level, and to provide a current control integrated circuit for the backlight device for display.

Yet another object of the present disclosure is to provide a backlight device for display that is capable of performing multi-functions, thereby providing an amount of good-quality light to an LCD panel to ensure high reliability, and to provide a current control integrated circuit for the backlight device for display.

Technical Solution

According to one aspect of the present disclosure, there is provided a backlight device for display, the device including: a backlight driving board providing column data and row data for backlight and providing a zoom control signal that results from determining a current band of a driving current for light emission using the column data; and a backlight panel controlling the light emission for providing the backlight using the column data, the row data, and the zoom control signal.

In the backlight device for display, the backlight panel includes: light-emitting diode channels arranged to have a plurality of columns and a plurality of rows, and divided into control groups, each including a predetermined number of adjacent light-emitting diodes sharing a column signal; a column driver providing the column signal corresponding to the column data to the plurality of columns; a row driver sequentially providing row signals corresponding to the row data to the plurality of rows; and current control integrated circuits configured in such a manner as to correspond to the control groups on a one-to-one basis, generating a sampling voltage that results from sequentially sampling the column signals, as the row signals corresponding to the control group, and controlling the driving current for the light emission from the light-emitting diode channel using the sampling voltage, thereby enabling a gain for conversion of the driving current by the sampling voltage to be controlled with the zoom control signal.

According to another aspect of the present disclosure, there is provided a current control integrated circuit including: a plurality of driving current control units sharing a column signal for backlight and controlling driving currents of a predetermined number of light-emitting diode channels belonging to the same control group, wherein the plurality of driving current control units receive the column signal for the control group and the zoom control signal in a shared manner and sequentially receive row signals, respectively, and wherein each of the plurality of driving current control units generates the sampling voltage that results from sampling the column signal using the row signal, controls the driving current for light emission from the light-emitting diode channel using the sampling voltage, and determining a value of the zoom control signal by being synchronized with the row signal, thereby enabling a gain for conversion of the driving current by the sampling voltage to be controlled with the value of the zoom control signal.

Advantageous Effects

According to the present disclosure, backlight can be provided to a display panel. Driving currents of light-emitting diode channels can be controlled by a sampling voltage of a column signal in such a manner as to maintain light emission for one frame. Therefore, according to the present disclosure, the light emission from the light-emitting diode channels for the backlight can be sufficiently maintained, thereby reducing or eliminating flicker.

In addition, according to the present disclosure, the light-emitting diode channels on a backlight board are divided into a plurality of control groups. Current control integrated circuits are provided to the control groups on a one-to-one basis. Therefore, according to the present disclosure, the driving currents for the light emission can be controlled on a per-control group basis. The application of the current control integrated circuit can facilitate the design and manufacturing of a backlight board for controlling the driving currents of the light-emitting diode channels.

In addition, according to the present disclosure, there is provided an advantage in controlling the driving current in the low current band using a low gray range, such as a dark gray level, to higher resolution. As a result, there is provided an advantage in smoothly representing a difference in luminance in the low current band for the backlight.

In addition, according to the present disclosure, an amount of good-quality light can be provided to an LCD panel by performing the above-mentioned multi-functions. Therefore, there is an advantage in securing high reliability.

MODE FOR INVENTION

Figure 1:
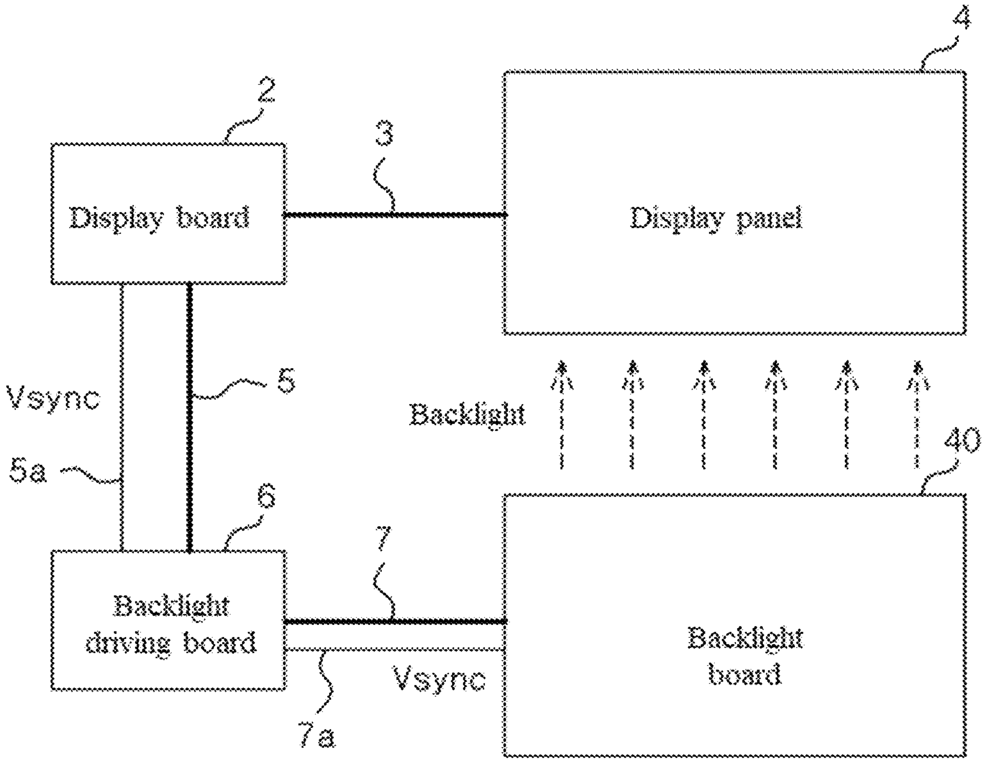
FIG. 1 is a block diagram illustrating a backlight device for display according to an embodiment of the present disclosure.

Preferred embodiments of the present disclosure will be described in detail below with reference to the accompanying drawings. The terms used in the present specification and the claims should not be interpreted in a manner that is limited to normal or dictionary definitions and should be broadly interpreted to convey meanings and concepts consistent with the technical idea of the present disclosure.

The embodiments described in the present disclosure and the constituent elements thereof illustrated in the drawings are preferred ones, but they do not necessarily represent the technical idea of the present disclosure. It would be apparent from the present specification that various modifications may be made to them. The equivalents or modification examples, which result from these modifications, should fall within the scope of the present disclosure.

A backlight device for display according to the present disclosure is configured to provide backlight to a display panel for displaying an image. The backlight may be provided by a backlight board overlapping the display panel.

The backlight board according to the present disclosure is configured to include current control integrated circuits to reduce or eliminate flicker caused by the backlight.

As illustrated in FIG. 1, the display device for displaying an image may include a display board 2, a display panel 4, a backlight driving board 6, and a backlight board 40.

The display board 2 and the display panel 4 may be understood as constituent elements for displaying an image.

For configuration for providing the backlight to the display panel 4, the display device may be understood as fundamentally including the backlight board 40. Additionally, the display device may be understood as further including at least one of the following: the backlight driving board 6 and the display board 2.

Figure 2:
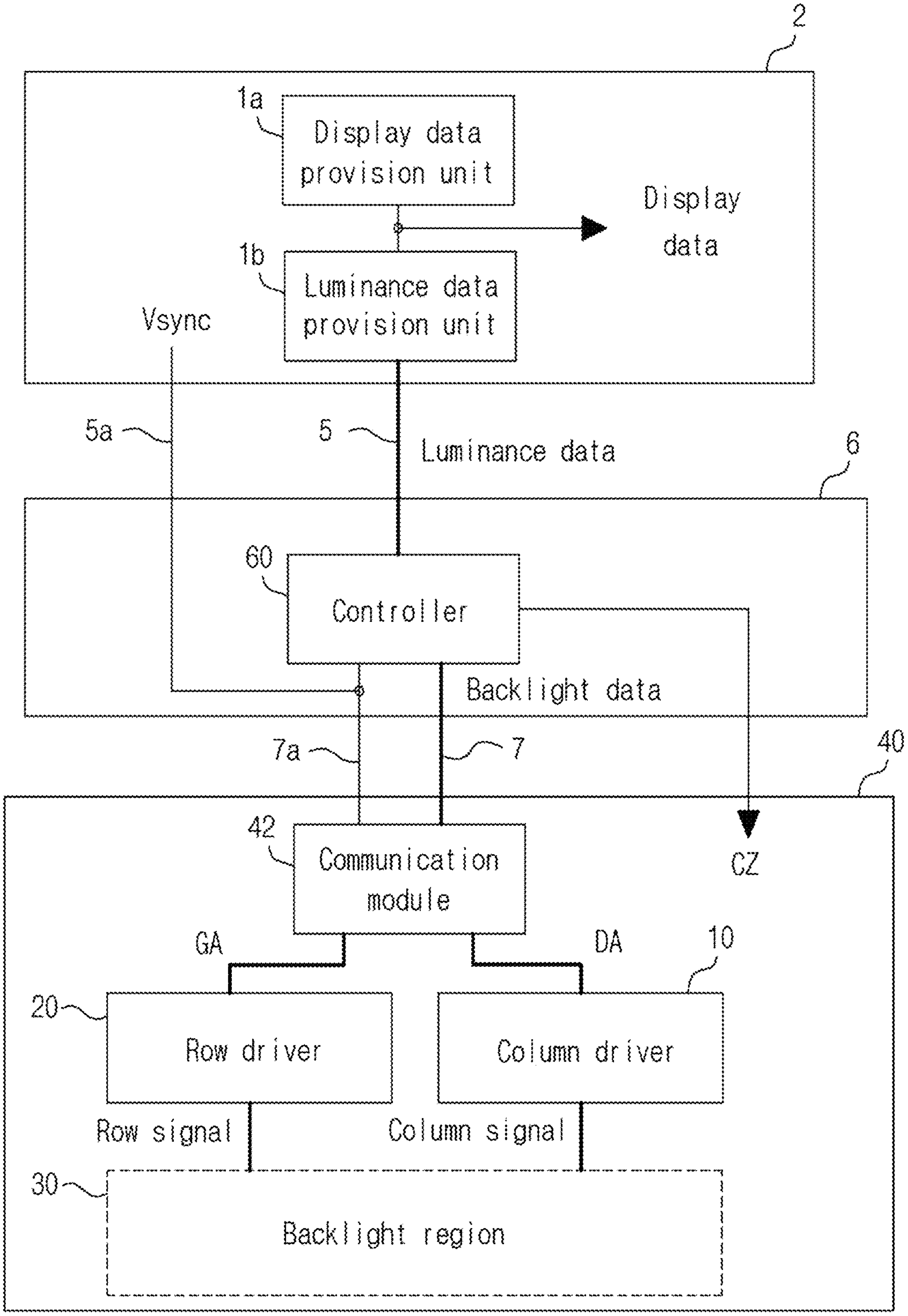
FIG. 2 is a block diagram illustrating an interface among a display board, a backlight driving board, and a backlight board.

With reference to FIG. 2, an interface among the display board 2, the backlight driving board 6, and the backlight board 40, which are illustrated in FIG. 1 can be specifically described.

The display panel 4 may be configured with an LCD panel.

Over a transmission line 3, the display panel 4 is interfaced with the display board 2 and receives data. The display panel 4 includes pixels (not illustrated) for realizing an image at the pre-designed resolution. Each pixel performs an optical shutter operation in a manner that corresponds to display data, thereby enabling an image using the backlight to be displayed.

The display panel 4 receives data for displaying an image, on a per-frame basis. For example, the data may include display data for displaying pixel brightness, a horizontal synchronization signal for distinguishing horizontal lines, and a vertical synchronization signal for distinguishing frames, among other things.

The display board 2 receives display data transferred from a video source (not illustrated).

The display board 2 may include a display data provision unit 1*a* that configures display data as packets and provides the resulting packets to the display panel 4, and may provide display data for displaying an image to the display panel 4.

The display data provision unit 1*a* may include components that configure display data as packets and provide the resulting packets to the display panel 4. The display data provision unit 1*a* may be understood as serving to perform a function of a timing controller typically employed in a display device. As a result, a separate description of the timing controller is omitted.

In addition, the display board 2 may include a luminance data provision unit 1*b* that generates luminance data corresponding to display data, and the luminance data provision unit 1*b* may provide the luminance data to the backlight driving board 6.

The resolution of the display panel 4 for representing an image is different from the resolution of the backlight board 40 that provides the backlight. In addition, a gray range and a gray value for the backlight may also be set to be different from a gray range and a gray value for representing an image. Therefore, the backlight board 40 needs backlight data that include a resolution value and a gray value for representing the backlight.

One frame of the backlight provided by the backlight board 40 is made up of a plurality of horizontal periods. Each horizontal period refers to a duration for providing the backlight data to columns in a single horizontal line within one frame. The backlight data include row data for distinguishing between column data corresponding to columns during horizontal periods that constitute one frame and the horizontal periods.

The luminance data provision unit 1*b* may generate the luminance data that satisfy the resolution value and gray value of the backlight using the display data for representing an image. For example, the luminance data provision unit 1*b* may provide the display data as the luminance data as is or may provide the luminance data that results from converting the display data in such a manner as to have the resolution value and gray value that correspond to the backlight.

The luminance data provision unit 1*b* is configured to generate luminance data at a format that enables the backlight driving board 6 to receive the luminance data and to provide the luminance data to the backlight driving board 6 over a transmission line 5.

For synchronization of the backlight driving board 6, the display board 2 may provide a vertical synchronization signal Vsync to the backlight driving board 6 over a transmission line 5*a*.

The backlight driving board 6 is configured to receive the luminance data and the vertical synchronization signal Vsync from the display board 2, to provide the backlight data to the backlight board 40 through a transmission line 7 having a plurality of transmission channels, and to provide the vertical synchronization signal Vsync to the backlight board 40 over a transmission line 7*a*.

The backlight driving board 6 may provide column data, row data, and a zoom control signal CZ, which are included in the backlight data, to the backlight board 40. The column data and the row data are data for driving the backlight, and the zoom control signal CZ is a signal that has a value that results from determining a current band of a driving current for light emission using the column data. The driving current here for light emission refers to a current that flows to the low side of a light-emitting diode channel described below, as a result of the light emission. The zoom control signal CZ will be described below with FIGS. 10 to 12.

The above-described backlight driving board 6 may include a controller 60.

The controller 60 may receive the luminance data over the transmission line 5 and may generate the column data corresponding to the resolution of the backlight, using the luminance data. In addition, the controller 60 may generate the row data on a per-horizontal period basis for the backlight by time-dividing a frequency using the vertical synchronization signal Vsync. Therefore, the controller 60 is configured to provide the backlight data, including the column data and the row data, to the backlight board 40 over a transmission line 7.

In a process of generating the column data, the controller 60 may generate the zoom control signal CZ that results from determining the current band of the driving current corresponding to a value of the column data for each light-emitting diode channel of the backlight board 40. At this point, the zoom control signal CZ may have, for example, a value according to which a determination is made as a low current band in which a preset reference amount of current is reached or not reached or as a maximum amount of current in which a high current band exceeds the preset reference amount of current.

For example, a value that varies with a current band of the zoom control signal CZ may be set to "H," which represents a logical HIGH state, in the case of the low current band and may be set to "L," which represents a logical LOW state, in the case of the high current band. The logical LOW state "L" may be understood as corresponding to 0 V, and the logical HIGH state "H" may be understood as corresponding to 5 V. The zoom control signal CZ that varies with the current band of the above-described driving current will be described below with reference to FIG. 10.

The zoom control signal CZ may be provided to current control integrated circuits that are arranged in a backlight region 30 of the backlight board 40, over a transmission line separate from that for the backlight data. Alternatively, the zoom control signal CZ may be included in the backlight data and may be provided to the backlight board 40 over the transmission line 7.

The backlight board 40 is configured to receive the backlight data and the vertical synchronization signal Vsync of the backlight driving board 6. Furthermore, the backlight board 40 is configured to provide the backlight to the display panel 4 by enabling the light-emitting diode channels to emit light in a manner corresponding to the backlight data.

To this end, the backlight board 40 includes a communication module 42 that receives the backlight data and the vertical synchronization signal Vsync, a column driver 10 that provides a column signal corresponding to the column data, and a row driver 20 that provides a row signal corresponding to the row data.

The communication module 42 receives the backlight data through the transmission line 7 and receives the vertical synchronization signal Vsync over the transmission line 7*a*.

The communication module 42 may distinguish between the column data DA and the row data GA in the backlight data using the vertical synchronization signal Vsync. The communication module 42 may provide the column data DA to the column driver 10 and may provide the row data GA to the row driver 20.

The communication module 42 may have a function of restoring the column data DA and the row data GA from the backlight data transmitted in packets. Using the vertical synchronization signal Vsync, on a per-horizontal period basis, the communication module 42 may provide the column data DA to the column driver 10 and the row data GA the row driver 20.

In a case where the zoom control signal CZ is included in the backlight data, the communication module 42 may separate the zoom control signal CZ from the backlight data. At this point, the communication module 42 may also restore the zoom control signal CZ on a per-horizontal period basis using the vertical synchronization signal Vsync.

The zoom control signal CZ that may be restored by the communication module 42 or may be provided from the backlight driving board 6 over a separate transmission line may be provided to the current control integrated circuits arranged in the backlight region 30 of the backlight board 40.

The column driver 10 is configured to receive the column data DA on a per-horizontal period and to perform digital-to-analog conversion that converts the column data DA on a per-column basis for the backlight into an analog column signal.

In addition, the row driver 20 is configured to receive the row data GA on a per-horizontal period basis and to sequentially output the row signals corresponding to the row data GA on a per-horizontal period basis for the backlight.

Figure 3:
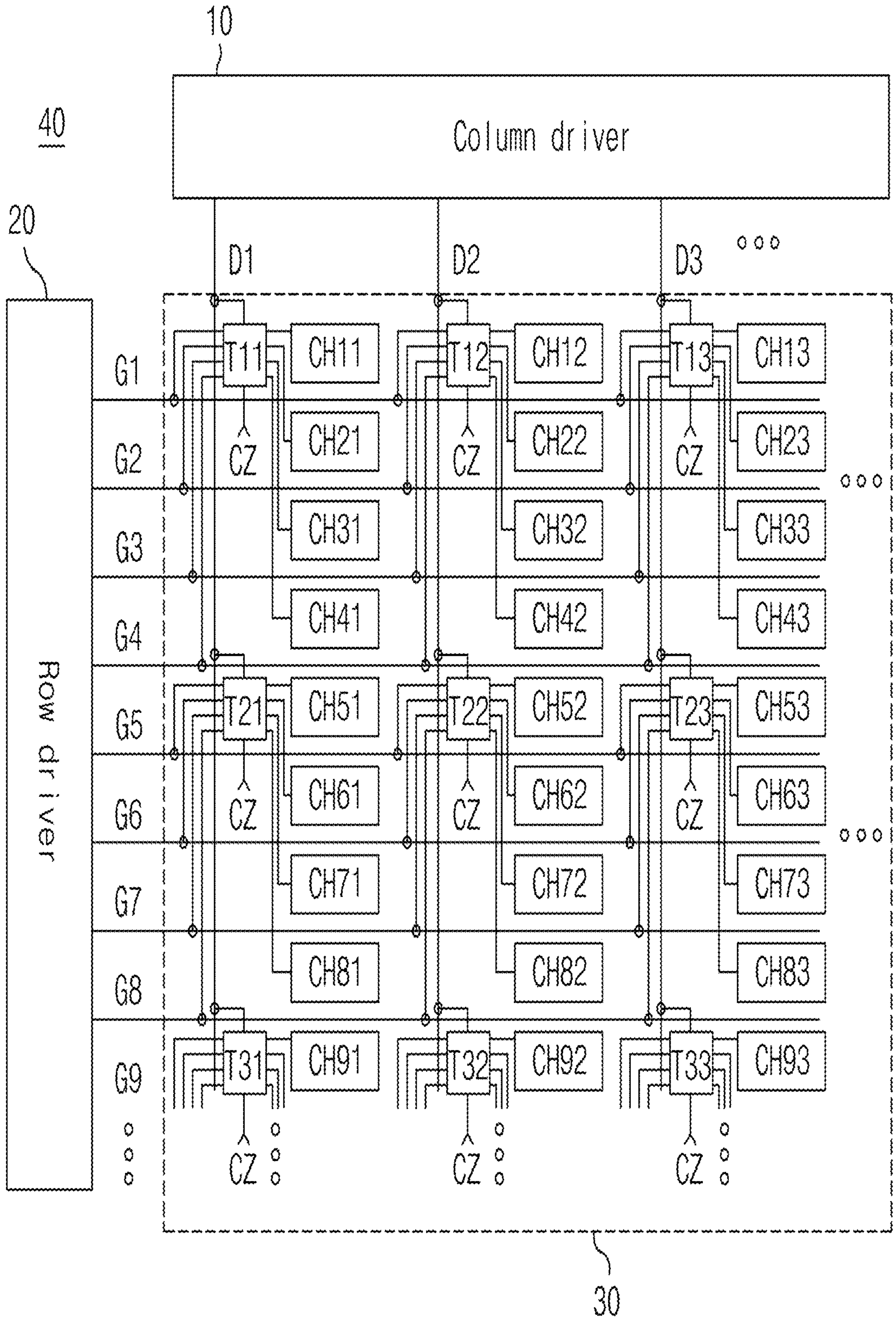
FIG. 3 is a block diagram illustrating a configuration of one portion of the backlight board included in the backlight device for display according to the embodiment of the present disclosure.

The light-emitting diode channels that emit light to provide the backlight, and the current control integrated circuits for controlling this light emission are arranged in the backlight region 30 of the backlight board 40. A configuration of the above-described backlight region 30 may be described with respect to FIG. 3. FIG. 3 illustrates that the column driver 10 and the row driver 20 are formed outside the backlight region 30.

In FIG. 3, light-emitting diode channels are indicated by "CH11 to CH93), and the current control integrated circuits are indicated by "T11, T12, T13, T21, T22, T23, T31, T32, and T33."

It can be understood that the backlight board 40 serves to provide to the display panel 4 the backlight for displaying an image and that the backlight region 30 serves as a region providing the backlight because the light-emitting diode channels CH11 to CH93 emit light.

The backlight board 40 with the above-described configuration operates as a surface light source resulting from a collection of light sources.

The backlight board 40 in FIG. 3 includes light-emitting diode channels CH11 to CH93, as light sources, that use LEDs as light sources. The light-emitting diode channels CH11 to CH93 may be arranged to employ, for example, a matrix structure that is made up of columns and rows. It can be understood that each of the light-emitting diode channels CH11 to CH93 includes a plurality of LEDs that are serially connected to each other.

According to an embodiment of the present disclosure, the light-emitting diode channels CH11 to CH93 are divided into a plurality of control groups.

It can be interpreted that the control group according to the present disclosure includes a predetermined number of light-emitting diodes adjacent to each other that share the column signal. According to the embodiment of the present disclosure, for example, the control group includes a predetermined number of light-emitting diodes arranged successively in the same column. Alternatively, the control group may be defined as being distributed in a plurality of columns and including a predetermined number of light-emitting diodes arranged successively in each column.

As an example, all the light-emitting diode channels CH11 to CH93 share the column signal and are divided into groups, each including four light-emitting diode channels arranged successively in the same column. The control group may be defined as including the four light-emitting diode channels, resulting from the division.

That is, the light-emitting diode channels CH11, CH21, CH31, and CH41, the light-emitting diode channels CH51, CH61, CH71, and CH81, the light-emitting diode channels CH12, CH22, CH32, and CH42, the light-emitting diode channels CH52, CH62, CH72, and CH82, the light-emitting diode channels CH13, CH23, CH33, and CH43, and the light-emitting diode channels CH53, CH63, CH73, and CH83 are each divided into one control group.

According to the embodiment of the present disclosure, the current control integrated circuits T11, T12, T13, T21, T22, T23, T31, T32, and T33, one of which corresponds to each of the control groups, are provided. That is, the current control integrated circuits T11, T12, T13, T21, T22, T23, T31, T32, and T33 in FIG. 3 are configured to be positioned on the backlight board 40 to correspond one-to-one to each of the control groups of all the current control integrated circuits CH11 to CH93.

More specifically, the current control integrated circuit T11 is configured to control driving currents for the light-emitting diode channels CH11, CH21, CH31, and CH41. Likewise, the current control integrated circuit T21 is configured to control driving currents for the light-emitting diode channels CH51, CH61, CH71, and CH81. Likewise, the current control integrated circuit T12 is configured to control driving currents for the light-emitting diode channels CH12, CH22, CH32, and CH42. Likewise, the current control integrated circuit T22 is configured to control driving currents for the light-emitting diode channels CH52, CH62, CH72, and CH82. Likewise, the current control integrated circuit T13 is configured to control driving currents for the light-emitting diode channels CH13, CH23, CH33, and CH43. Likewise, the current control integrated circuit T23 is configured to control driving currents for the light-emitting diode channels CH53, CH63, CH73, and CH83.

The current control integrated circuits T11, T12, T13, T21, T22, T23, T31, T32, and T33 are configured to receive the column signal from the column driver 10 and to receive the row signals from the row driver 20. Column signals are indicated by D1, D2, D3 and so forth, and row signals are indicated by G1, G2, G3 and so forth.

One backlight board 40 provides the backlight having resolution determined by all the light-emitting diode channels CH11 to CH93. Data for one frame of the backlight includes data for a plurality of horizontal periods.

The column driver 10 is configured to provide the column signals that correspond to every horizontal period for the backlight. For example, the column driver 10 provides the column signals D1, D2, and D3 that correspond to the columns for the light-emitting diode channels, on a per-horizontal period basis, simultaneously. Column-based signal lines to which the column signals D1, D2, and D3 are applied may be referred to as column lines.

The column driver 10 receives the column data with a value for representing brightness and provides the column signals D1, D2, and D3 that correspond to the column data.

The row driver 20 is configured to receive the row data and to provide the row signals G1, G2, and so forth up to G9 that correspond to the rows for the light-emitting diode channels on a basis per one frame of the backlight in a manner that corresponds to the row data. The row signals G1, G2, and so forth up to G9 have a preset pulse width and are sequentially provided according to the horizontal period for the backlight. Row-based signal lines to which the row signals G1, G2, and so forth up to G9 are applied may be referred to as row lines.

Each of the current control integrated circuits T11, T12, T13, T21, T22, T23, T31, T32, and T33 receives the column signal and the row signals for the control group that corresponds to each.

To this end, the current control integrated circuits T11, T21, and T31 share one column line in such a manner as to receive the column signal D1. Likewise, the current control integrated circuits T12, T22, and T32 share one column line in such a manner as to receive the column signal D2.

Likewise, the current control integrated circuits T31, T23, and T33 share one column line in such a manner as to receive the column signal D3.

Each of the current control integrated circuits T11, T12, T13, T21, T22, T23, T31, T32, and T33 receives the row signal for the control group. The current control integrated circuits T11, T12, and T13 positioned in the same row receive the row signal for the same horizontal period and share the row line. Likewise, the current control integrated circuits T21, T22, and T23 positioned in the same row receive the row signal for the same horizontal period and share the row line. Likewise, the current control integrated circuits T31, T32, and T33 positioned in the same row receive the row signal for the same horizontal period and share the row line.

The current control integrated circuits T11, T12, T13, T21, T22, T23, T31, T32, and T33 control the light emission from the light-emitting diode channels. This control is performed by receiving the column signal and the row signals, which correspond to the control group, as described above, and by controlling the driving currents for the light-emitting diode channels in the control group. For example, the current control integrated circuit T11, as described above, receives the column signal D1, receives the row signals G1 to G4 periodically on a per-horizontal period basis, and controls the driving currents for the light-emitting diode channels CH11, CH21, CH31, and CH41 on a per-horizontal period basis. Thus, the current control integrated circuit T11 controls the light emission from the light-emitting diode channels CH11, CH21, CH31, and CH41.

The above-described current control integrated circuits T11, T12, T13, T21, T22, T23, T31, T32, and T33 may generate sampling voltages that result from sequentially sampling the column signals on a per-horizontal period basis using the row signals, and may control the light emission and brightness maintenance of the light-emitting diode channels in the control group using the sampling voltages. For example, the current control integrated circuit T11 generates the sampling voltages that result from sampling the column signal D1 on a per-horizontal period basis using the row signals G1 to G4 on a per-horizontal period that are sequentially provided, and controls the driving currents for the light-emitting diode channels CH11, CH21, CH31, and CH41 that belong to the same control group, using the sampling voltages.

Each of the current control integrated circuits T11, T12, T13, T21, T22, T23, T31, T32, and T33 may receive the zoom control signal CZ for controlling the driving current. The zoom control signal CZ will be described below.

Figure 4:
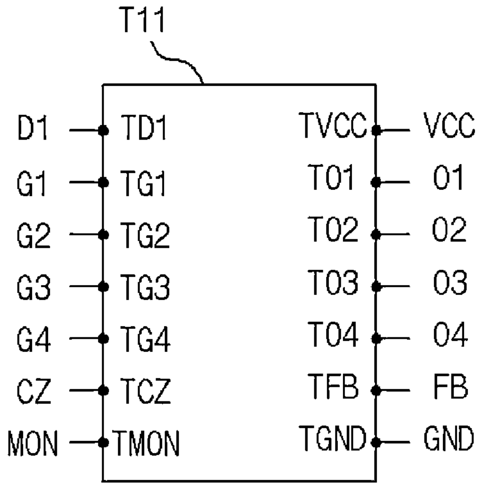
FIG. 4 is a diagram illustrating a current control integrated circuit in FIG. 3.

Each of the above-described current control integrated circuits T11, T12, T13, T21, T22, T23, T31, T32, and T33, which are configured as illustrated in FIG. 3, may be specifically illustrated as in FIG. 4. FIG. 4 illustrates the current control integrated circuit T11.

FIG. 4 illustrates that the current control integrated circuit T11 includes a column input terminal TD1, row input terminals TG1 to TG4, a zoom input terminal TCZ, a monitor terminal TMON, a grounding terminal TGND, an operational voltage terminal TVCC, a feedback terminal TFB, and control terminals T01 to T04. These terminals function as follows. The column input terminal TD1 receives the column signal D1. The row input terminals TG1 to TG4 receive the row signals G1 to G4, respectively. The zoom input terminal TCZ receives the zoom control signal CZ. The monitor terminal TMON outputs a monitor signal MON. The grounding terminal TGND is connected to a ground GND. The operational voltage terminal TVCC is provided with an operational voltage VCC. The feedback terminal TFB outputs a feedback signal FB. The control terminals T01 to T04 receive driving currents 01 to 04 for the light-emitting diode channels CH1, CH21, CH31, and CH41, respectively.

Figure 5:
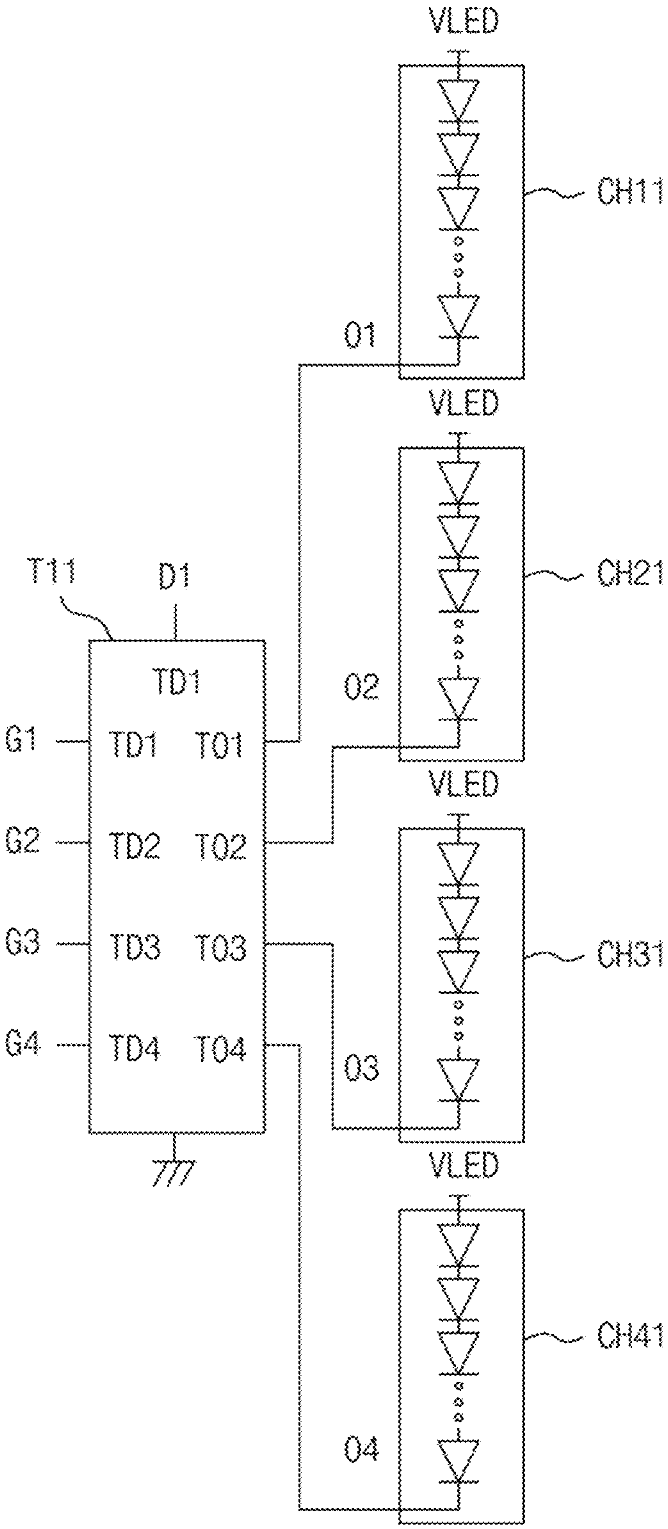
FIG. 5 is a block diagram illustrating an electrical connectional relationship between the current control integrated circuit and each of the light-emitting diode channels.

An electrical connection between the current control integrated circuit T11 and each of the light-emitting diode channels CH1, CH21, CH31, and CH41 corresponding to the control group, which are illustrated in FIG. 4, can be understood from FIG. 5.

A light-emitting voltage VLED is applied to each of the light-emitting diode channels CH11, CH21, CH31, and CH41. Each of the light-emitting diode channels CH11, CH21, CH31, and CH41 includes a plurality of LEDs connected serially. The driving currents 01 to 04 on the low sides, respectively, of the light-emitting diode channels CH11, CH21, CH31, and CH41 are applied to the current control integrated circuit T11.

Configurations of the remaining current control integrated circuits T12, T13, T21, T22, T23, T31, T32, and T33 can also be understood from FIGS. 4 and 5.

Figure 6:
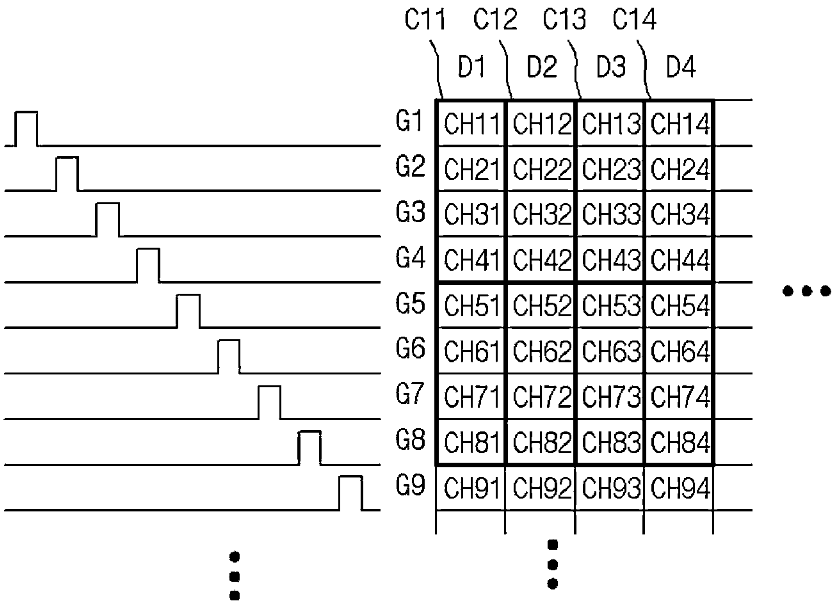
FIG. 6 is a diagram illustrating an arrangement of the light-emitting diode channels and control groups.

FIG. 6 illustrates the arrangement of the light-emitting diode channels and the division into the control groups. FIG. 6 illustrates a control group C11 including the light-emitting diode channels CH11, CH21, CH31, and CH41, a control group C12 including the light-emitting diode channels CH12, CH22, CH32, and CH42, a control group C13 including the light-emitting diode channels CH13, CH24, CH34, and CH44, and a control group C14 including the light-emitting diode channels CH14, CH24, CH34, and CH44.

One column signal and four row signals are input into each of the control groups. The column signals to be applied to each of the light-emitting diode channels may be provided in such a manner as to have voltage levels for brightness, which are illustrated in FIG. 7.

Figure 7:
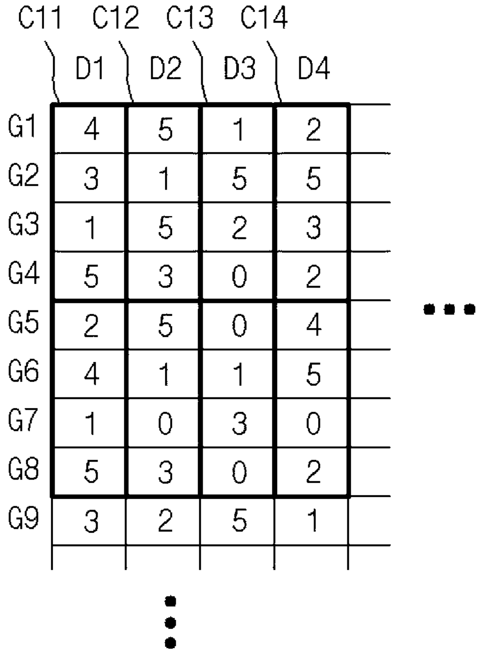
FIG. 7 is a diagram illustrating the brightness of the light-emitting diode channels that are achieved with a column signal.

More specifically, FIG. 7 illustrates that the column signals D1, D2, D3, and D4 are provided as having “4, 5, 1, and 2” levels, respectively, at the first horizontal period at which the row signal G1 is provided and that the column signals D1, D2, D3, and D4 are provided as having “3, 1, 5, and 5” levels at the second horizontal period at which the row signal G2 is provided. At this point, it can be understood that level values in FIG. 7 are exemplary numerical values for representing amplitudes, not actual voltage levels. As an example, values of the column signal are represented using eight levels ranging from 0 to 7. The values of the column signal may be represented using various levels according to resolution for representing brightness. For example, the values of the column signal may be represented using 16 levels, 32 levels, or 64 levels for resolution.

According to the embodiment of the present disclosure, the backlight device may operate with the column signals and the row signals, which are provided as illustrated in FIGS. 6 and 7. From FIG. 8, it can be understood that, according to the embodiment of the present disclosure, the column signal is sampled with the row signals.

Figure 8:
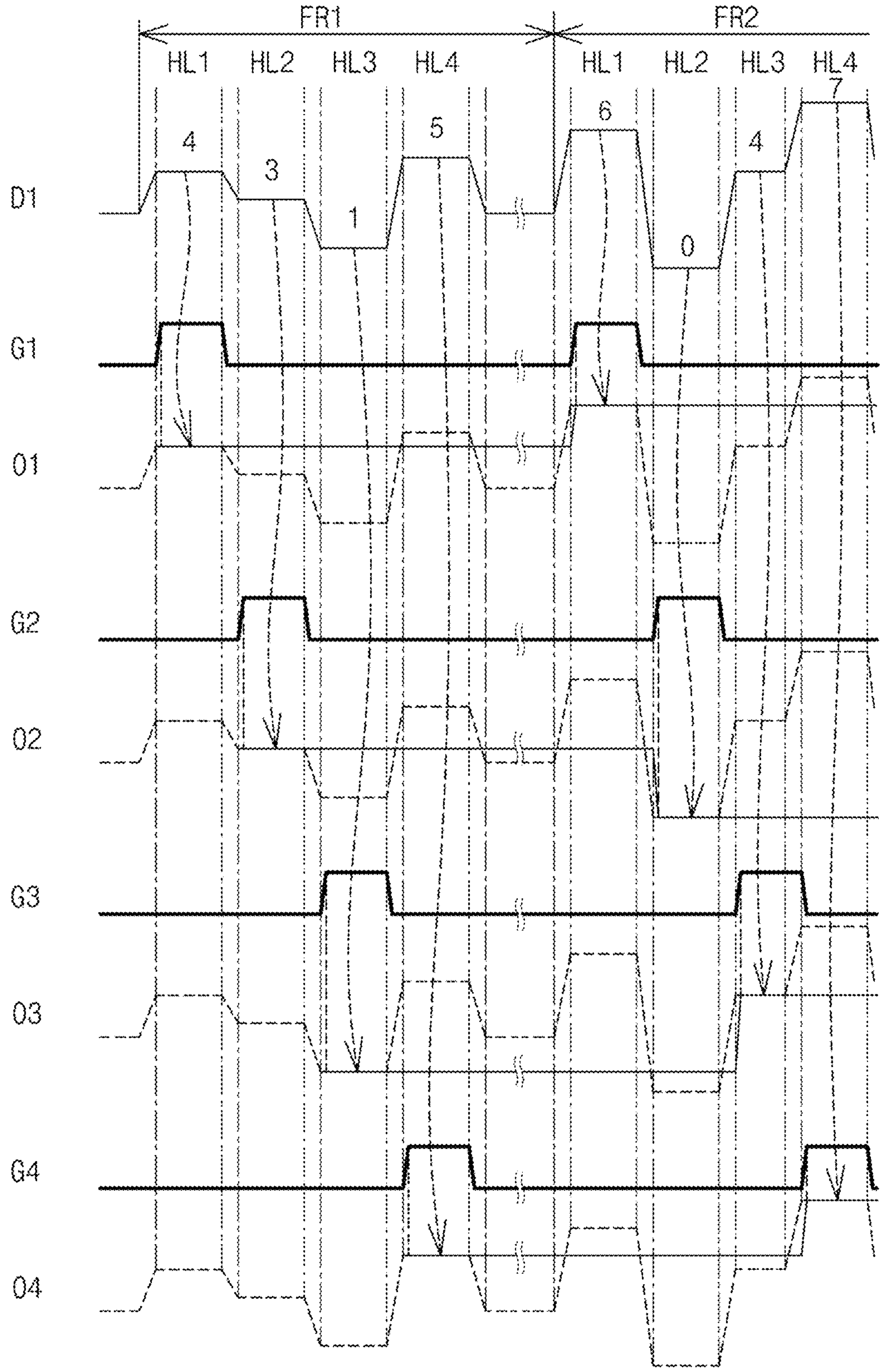
FIG. 8 is a waveform diagram that is referenced to describe one example of the operation of the current control integrated circuit.

In FIG. 8, FR1 and FR2 indicate frame periods of the backlight, HL1 to HL 4 indicate horizontal periods of the backlight, D1 indicates a column signal, and G1 to G4 indicate row signals. “4, 3, 1, and 5” of the column signal D1 represent levels, that is, amplitudes, of the column signal illustrated in FIG. 6.

In this case, according to the embodiment of the present disclosure, the driving current is controlled with the level, that is, the amplitude of the column signal that is represented by a pulse. This control can be understood as controlling driving current using a pulse amplitude modulation (hereinafter referred to as "PAM").

FIG. 8 is a waveform diagram that is referenced to describe the operation of the current control integrated circuit.

With reference to FIG. 8, at a horizontal period HL1 of a frame FR1, the column signal D1 is provided at the level "4" to the current control integrated circuit T11. At the horizontal period HL1, the row signal G1 is provided at a level (for example, at a "HIGH" level) for sampling. In this case, the current control integrated circuit T11 generates a sampling voltage that results from sampling a column signal having the level "4", using the row signal G1, and, for light emission, performs control in such a manner that the driving current 01 having the level "4," which corresponds to a level of the sampling voltage, flows through the light-emitting diode channel CH11. The sampling voltage of the current control integrated circuit T11 is maintained up to the horizontal period HL1 of the next frame FR2. Therefore, the current control integrated circuit T11 maintains the driving current 01, having the level "4," of the light-emitting diode channel CH11 up to the horizontal period HL1 of the next frame FR2.

The column signal D1 changes to the level "3," "1," and "5" in such a manner as to correspond to the horizontal periods HL2, HL3, and HL4, respectively, that sequentially proceed, following the horizontal period HL1. The current control integrated circuit T11 generates the sampling voltages that result from sampling the column signal, using the row signals G2, G3, and G4 that are sequentially provided on a per-horizontal period basis, and, for light emission, performs control in such a manner that the driving currents 02, 03, and 04, which correspond to the levels, respectively, of the sampling voltages, flow.

The sampling voltages generated using the row signals G2, G3, and G4 of the current control integrated circuit T11 are maintained up to the horizontal period HL2, HL3, and HL4, respectively, of the next frame FR2. Therefore, the current control integrated circuit T11 maintains the levels of the driving currents 02, 03, and 04 of the light-emitting diode channel CH11 in such a manner that the brightness at the level corresponding to the column signal D1 for each horizontal period is maintained up to the next frame FR3.

It can be understood that then, the sampling voltages generated using the row signal G2, G3, G4 of the current control integrated circuit T11, as described above, are maintained for one frame period and are reset on a per-frame period basis in such a manner as to have a level corresponding to a current column signal.

That is, the current control integrated circuit T11 generates the sampling voltages for the light-emitting diode channels CH11, CH21, CH31, and CH41 in a manner that corresponds to the column signal D1 and the row signals G1 to G4. Furthermore, the current control integrated circuit T11 controls the driving current between each of the control terminals T01 to T04, corresponding to the low sides, respectively, of the light-emitting diode channels CH11, CH21, CH31, and CH41 and the ground GND, using the sampling voltages.

Figure 9:
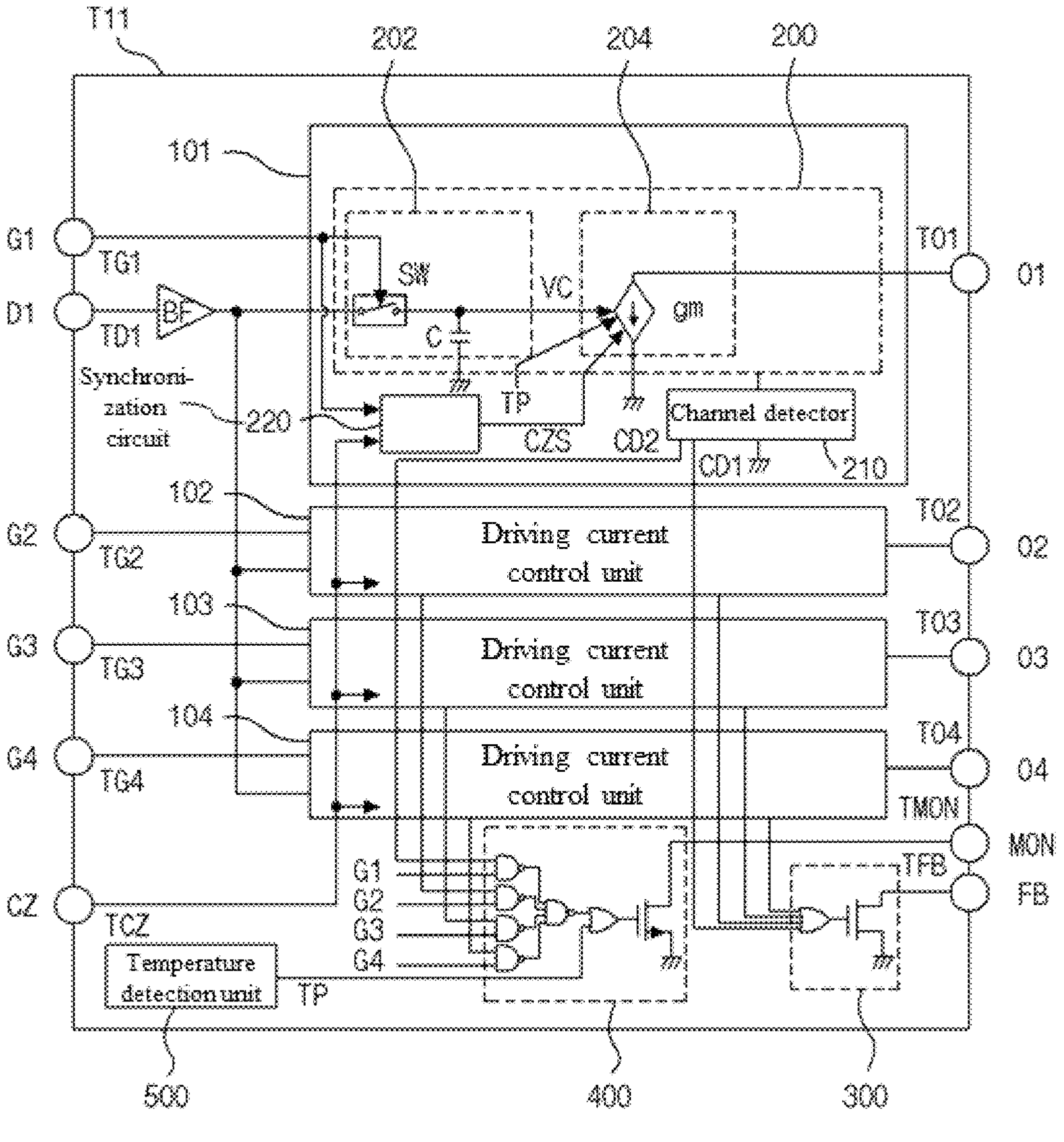
FIG. 9 is a detailed block diagram illustrating one example of the current control integrated circuit.

For the above-described operation, the current control integrated circuit T11 may be configured as illustrated in FIG. 9.

The current control integrated circuit T11 is configured to include a buffer BF, driving current control units 101 to 104, a feedback signal provision unit 300, a monitor signal provision unit 400, and a temperature detection unit 500.

The buffer BF is configured to receive the column signal D1 through the column input terminal TD1, and to provide the received column signal D1 to the driving current control units 101 to 104 in a shared manner. It is illustrated that the buffer BF is configured to be shared among the driving current control units 101 to 104. Alternatively, the buffers BF may be designed in such a manner to be embedded into the driving current control units 101 to 104, respectively. In this case, the respective buffers BF may be configured to share the column signal D1.

The driving current control units 101 to 104 each are configured to generate the sampling voltages VC that result from sampling the column signal D1 using the row signals G1 to G4 of the light-emitting diode channel. Furthermore, each thereof is configured to control the driving currents 01 to 04 of the light-emitting diode channels CH11, CH21, CH31, and CH41 connected to the control terminals T01 to T04, respectively, using the sampling voltages VC.

The configuration and operation of the driving current control unit 101, representing the driving current control units 101 to 104, are described. It can be understood that the driving current control units 102 to 104 have the same configuration as the driving current control unit 101.

First, the driving current control unit 101 is configured to receive the column signal D1, the row signal G1, a temperature detection signal TP, and the zoom control signal CZ and to control the driving current 01.

The driving current control unit 101 includes an internal circuit 200, a channel detector 210, and a synchronization circuit 220.

In this case, the synchronization circuit 220 provides a synchronization zoom control signal CZS corresponding to a value of the zoom control signal CZ that is synchronized with the row signal G1 and is input earlier than the row signal G1. It can be understood that at this point, the synchronization zoom control signal CZS is synchronized at a point in time at which the row signal G1 rises. For reference, it can be understood that the driving current control units 101 to 104 generate the synchronization zoom control signal CZS from the zoom control signal CZ at different timings using the row signals G1 to G4 that are sequentially input. The synchronization of the above-described synchronization zoom control signal CZS can be understood from FIG. 11.

FIG. 9 illustrates that the internal circuit 200 includes a holding circuit 202 and a channel current control unit 204.

The holding circuit 202 is configured to generate the sampling voltage VC that results from the column signal D1 using the row signal G1, and to maintain the sampling voltages VC. To this end, the holding circuit 202 includes a switch SW that switches on with the row signal G1 to transfer the column signal D1, and a capacitor C that generates the sampling voltage VC resulting from sampling the column signal D1 transferred through the switch SW. The capacitor C performs sampling that enables charging with the column signal D1 transferred through the switch SW while the row signal G1 is enabled, and stores and generates the sampling voltage VC corresponding to the result of the sampling. Then, the capacitor C may provide the sampling voltages VC to the channel current control unit 204 while maintaining the sampling voltages VC.

The channel current control unit 204 controls the driving current 01 for the light emission from the light-emitting diode channel using the sampling voltages VC, and determines the value of the zoom control signal CZ by being synchronized with the row signal. A gain for conversion of the driving current 01 by the sampling voltage VC may be controlled with the value of the zoom control signal CZ.

More specifically, the channel current control unit 204 is configured to control an amount of the driving current 01 for the light emission from the light-emitting diode channel CH11 connected to the control terminal T01, using the sampling voltage VC of the capacitor C. The channel current control unit 204 may be configured to have a dependent current source gm that controls the flow of the driving current 01 in order to have an amount of current necessary for performing control using the level of the sample voltage VC. The dependent current source gm may receive the temperature detection signal TP and the synchronization zoom control signal CZS. The dependent current source gm may block the flow of the driving current using the temperature detection signal TP. In addition, the dependent current source gm may be synchronized with the row signal and may receive the synchronization zoom control signal CZS. Furthermore, the dependent current source gm may have a gain controlled according to a logical level of the synchronization zoom control signal CZS corresponding to the value of the zoom control signal CZ. Therefore, the dependent current source gm may be configured to control the amount of the driving current using the sampling voltage VC, as the gain that varies according to the logical level of the synchronization zoom control signal CZS.

The channel detector 210 may be configured to detect a voltage between the control terminal T01 and the ground GND and to provide a first detection signal CD1 and a second detection signal CD2.

In this case, the first detection signal CD1 results from determining whether or not the voltage between the control terminal T01 and the ground GND is at or below a first level, and the second detection signal CD2 results from determining whether or not the voltage between the control terminal T01 and the ground GND is at or below a second level that is lower than the first level. Additionally, the second detection signal CD2 results from determining whether or not the voltage between the control terminal T01 and the ground GND is at or above a preset level (for example, 30 V) that is higher the first level. According to a condition, the first detection signal CD1 and the second detection signal CD2 may be provided in such a manner to have the HIGH level.

The driving current 01 may decrease in a case where the light-emitting voltage VLED that is applied to the light-emitting diode channel CH11 is lower than a minimum light-emitting voltage. Therefore, when the light-emitting voltage VLED is regulated to reach or exceed minimum light-emitting voltage, the driving current 01 is also regulated. As a result, the brightness of the light-emitting diode channel CH11 may be consistently maintained. The detection signal CD1 is a signal for regulating the above-described driving current 01. When the voltage between the control terminal T01 and the ground GND decreases to or below a preset level (for example, 0.5 V), the detection signal CD1 may be provided in a state of being activated to the HIGH state. The first detection signal CD1 may be provided to the feedback signal provision unit 300.

Regarding to the driving current 01, in a case where the light-emitting diode channel CH11 is open, the light-emitting voltage VLED is regulated to reach a maximum light-emitting voltage. As a result, the driving current 01 may flow abnormally in large amounts through the other light-emitting diode channels that are not open. In this case, when the voltage between the control terminal T01 to the ground GND decreases to or below a preset level (for example, 0.2 V) that is lower than the first level, the second detection signal CD2 may be provided in a state of being activated to the HIGH level.

In addition, regarding to the driving current 01, in a case where a short circuit occurs in the light-emitting diode channel CH11, the light-emitting voltage VLED that does not further drop by a voltage in the forward direction of the light-emitting diode channel CH11 in which the short circuit occurs is applied to a driving control terminal T01. As a result, an integrated circuit may generate excessive heat. In this case, when the voltage between the control terminal T01 to the ground GND increases to a preset level (for example, 30 V) that is higher than the first level, the second detection signal CD2 may be provided in a state of being activated to the HIGH state, The second detection signal CD2 may be provided to the monitor signal provision unit 400.

The feedback signal provision unit 300 is configured to control the feedback signal FB by controlling a current between the feedback terminal TFB and the ground GND in a manner that corresponds to each of the respective first detection signals CD1 of the driving current control units 101 to 104.

To this end, the feedback signal provision unit 300 may include an OR gate circuit and a current driving transistor. The OR gate circuit serves to control a gage of the current driving transistor in a manner that corresponds to at least one of the respective first detection signals CD1 of the driving current control units 101 to 104. The current driving transistor may control the feedback signal FB to the LOW level, in a manner that corresponds to a HIGH-level output of the OR gate circuit and may control the feedback signal FB to the HIGH level, in a manner that corresponds to a LOW-level output of the OR gate circuit.

That is, when a driving current of at least one of the driving current control units 101 to 104 decreases below a preset level, the feedback signal provision unit 300 may control the feedback signal FB to the LOW level.

Temperature detection unit 500 is configured to provide the temperature detection signal TP that results from sensing the temperature of the current control integrated circuit T11 configured with a chip. For example, the temperature detection unit 500 may provide the temperature detection signal TP activated to the HIGH level when the current control integrated circuit T11 increases to or above a preset temperature.

The temperature detection unit 500 detects the temperature that reaches or exceeds to the preset temperature. Thus, in a case where the temperature detection signal TP is activated, the flow of current from the dependent current source gm is blocked by the activated temperature detection signal TP. Conversely, the temperature detection unit 500 detects the temperature that does not reach the preset temperature. Thus, in a case where the temperature detection signal TP is deactivated, the flow of current from the dependent current source gm is not influenced by the temperature detection signal TP. The above-described temperature detection unit 500 controls the driving current, flowing through the light-emitting diode channel, in a manner that is disabled or enabled to pass through, thereby protecting the current control integrated circuit and the backlight device from being overheated.

The monitor signal provision unit 400 receives the second detection signals CD2 and the row signals G1 to G4 of the driving current control units 101 to 104. Then, in a case where the row signal and the second detection signal CD2 of at least one of the driving current control units 101 to 104 are in a state of being activated to the HIGH state, the monitor signal provision unit 400 controls the monitor signal MON by controlling a current between the monitor terminal TMON and the ground GND.

In addition, the monitor signal provision unit 400 is configured to control the monitor signal MON by controlling the current between the monitor terminal TMON and the ground GND according to the temperature detection signal TP.

To this end, the monitor signal provision unit 400 may include an OR gate circuit and a current driving transistor. In this case, the OR gate circuit may be configured to have the following. The OR gate circuit turns on the current driving transistor in a case where the row signal of the second detection signal CD2 of at least one of the driving current control units 101 to 104 are in a state of being activated to the HIGH level or where the temperature detection signal TP is in a state of being activated to the HIGH state. To this end, the OR gate circuit may include first NAND gates that compare the row signal and the second detection signal CD2 of each of the driving current control units 101 to 104, a second NAND gate that compares outputs of the first NAND gates, and an OR gate that OR-combines the output of the second NAND gate and the temperature detection signal TP. The above-described OR gate circuit may be manufactured in various ways by a manufacturer, and thus a specific configuration drawing thereof and a description of the operation thereof are omitted. The current driving transistor may be configured as an NMOS transistor.

With the above-described configuration, when at least one of the row signal G1 to G4 of the driving current control units 101 to 104 are enabled to the HIGH level, and the second detection signal CD2 of the driving current control units 101 to 104 in question is activated to the HIGH level, the monitor signal provision unit 400 may control the monitor signal MON to the LOW level by the current driving transistor being turned on. In addition, when the temperature detection signal TP is activated to the HIGH level, the monitor signal provision unit 400 may control the monitor signal MON to the LOW level by the current driving transistor being turned on.

The above-described monitor signal MON may be provided to a timing controller (not illustrated) or a separate application and thus may be used for control that is performed when the backlight device operates abnormally.

Figure 10:
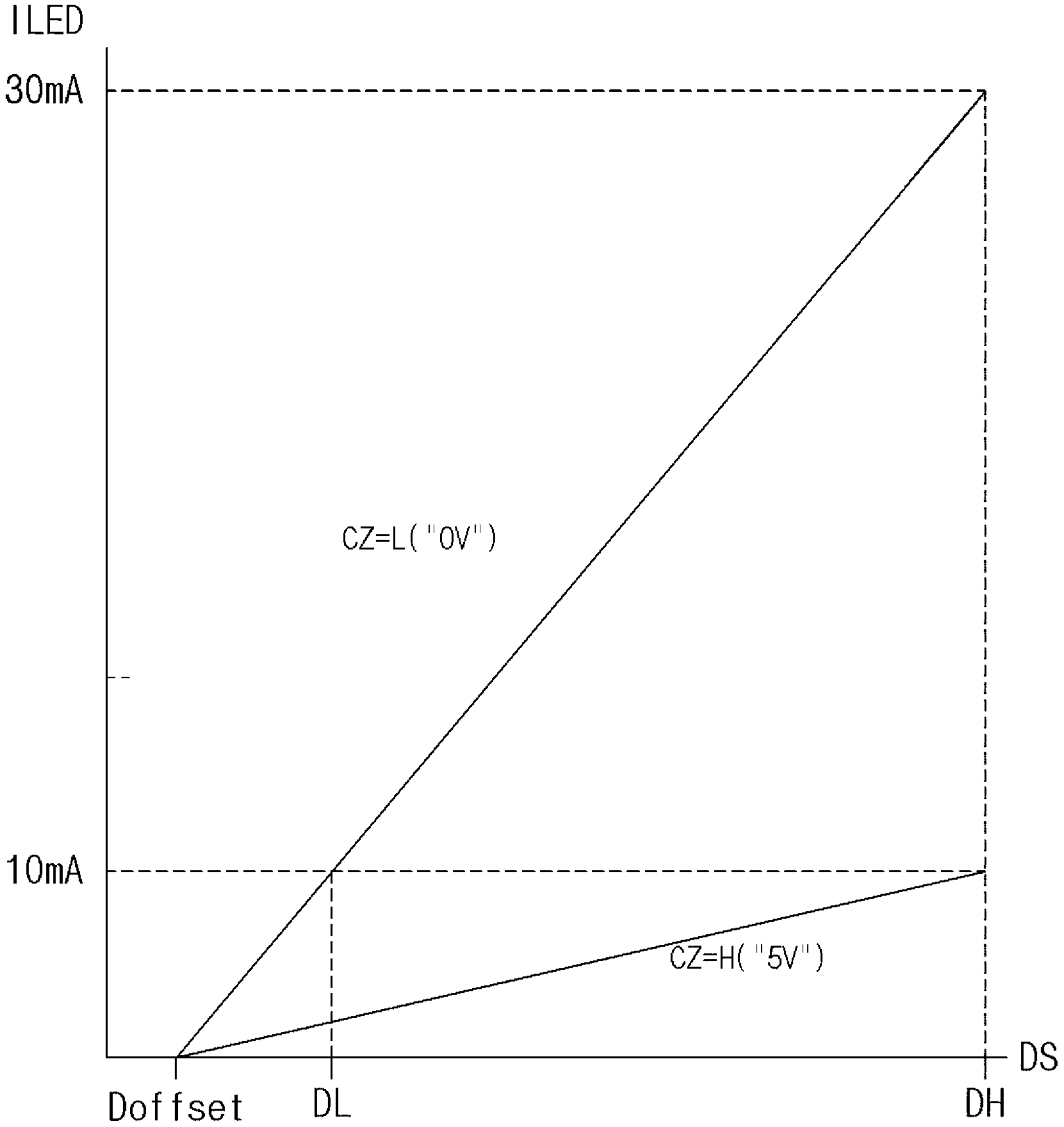
FIG. 10 is a graph that is referenced to describe a change in resolution that is achieved with a zoom control signal.

FIG. 10 is a graph showing roughly a relationship between a driving current ILED and the column signal DS to describe the control of the driving current by the control signal CZ. In the graph, the column signal DS can be understood as a voltage component, and can have a level corresponding to the column data. Doffset depicts an offset voltage formed by the buffer BF.

In FIG. 10, a driving current of 10 mA can be understood as a reference amount of current for determining the low current band and the high current band.

The controller 60 of the backlight driving board 6, as described above, may generate the zoom control signal CZ that results from the current band of the driving current.

The zoom control signal CZ may have a value according to which a determination is made as the low current band in which a preset reference amount of current of 10 mA is reached or not reached or as the high current band in which the maximum amount of current exceeds the present reference amount of current. In FIG. 10, the maximum amount of current can be understood as 30 mA.

In FIG. 10, in the case of the low current band, the zoom control signal CZ is indicated by the logical HIGH state "H." The logical HIGH state "H" may be set to 5 V. In the case of the high current band, the zoom control signal CZ may be indicated by the logical LOW state "L." The logical LOW state "L" may be set to 0 V.

The controller 60 may determine the amount of current of the driving current, as the value of the column data, and may provide the zoom control signal CZ that results from determining the current band of the driving current as the low current band or as the high current band.

At this point, the controller 60 may determine the current band of the driving current that corresponds to one period of the row signal using the column data for one horizontal period of the backlight. Furthermore, the controller 60 may provide the zoom control signal CZ with the same value to the current control integrated circuits that correspond to all the control groups on a one-to-one basis, for one period of the row signal.

Then, when at least one of the driving currents that correspond to the column data for one horizontal period of the backlight corresponds to the high current band, the controller 60 may provide the zoom control signal CZ that results from the determination as the high current band for the horizontal period in question.

In addition, when all the driving currents that correspond to the column data for one horizontal period of the backlight correspond to the low current band, the controller 60 may provide the zoom control signal CZ that results from the determination as the low current band for the horizontal period in question.

In addition, the controller 60 may receive and store the column data and the row data that correspond to one frame of the backlight, and may store the zoom control signal that determines the current band on a per-horizontal period basis. Then, the controller 60 may provide the zoom control signal CZ to the backlight board 40 on a per-horizontal period basis in a manner that corresponds to the providing of the column data and the row data to the backlight board 40.

Consequently, when all the driving currents correspond to the low current band, the controller 60 provides the zoom control signal CZ in the logical HIGH state H (CZ=H). When at least one of the driving currents corresponds to the high current band, the controller 60 provides the control signal CZ in the logical LOW state L (CZ=L).

The driving current control units 101 to 104 of the current control integrated circuit T11 are configured in such a manner that they receive the column signal D1 for the control group and the zoom control signal CZ of the above-described controller 60 in a shared manner and sequentially receive the row signals G1 to G4, respectively.

The driving current control unit 101 is configured to generate the sampling voltage VC that results from sampling the column signal D1 using the row signal G1.

The channel current control unit 204 of the driving current control unit 101 is configured to receive the sampling voltage VC of the holding circuit 202, and the zoom control signal CZ and synchronization zoom control signals CZS1 to CZS4 that are provided from the outside.

When the controller 60 provides the zoom control signal CZ in the logical HIGH state H (CZ=H), this is a case where all the driving currents correspond to the low current band of 10 mA or less. Therefore, in order to increase a voltage range of the sampling voltage VC, the dependent current source gm is controlled to have a gain value that decreases according to a level of the zoom control signal CZ. That is, the dependent current source gm may control an amount of the driving current 01 of the light-emitting diode channel, which is equal to or lower than 10 mA in FIG. 10, as in a voltage range that is expanded up to levels 0 to DH of the sampling voltage VC by the zoom control signal CZ of the decreased gain value.

That is, the amount of the driving current 01 of the light-emitting diode channel, which is equal to or lower than 10 mA, may be controlled by the sampling voltages VC, which have a voltage range expanded by the zoom control signal CZ when compared to a range of driving currents. Through this control, it can be understood that the driving current in the low current band is controlled to high resolution by a wide range of the sampling voltages.

Conversely, when the controller 60 provides the zoom control signal CZ in the logical LOW state L (CZ=L), this is a case where at least one of the driving currents corresponds to the high current band. Therefore, the dependent current source gm is controlled to maintain an original gain value according to the level of the zoom control signal CZ. That is, the dependent current source gm may control the amount of the driving current 01 of the light-emitting diode channel up to 30 mA, using the sampling voltage VC provided at the levels 0 to DH of the voltage in FIG. 10.

That is, the amount of the driving current 01 of the light-emitting diode channel may be controlled by the sampling voltage VC whose original voltage resolution is maintained by the zoom control signal CZ. Therefore, in a case where the driving current of the light-emitting diode channel is equal to or lower than 10 mA, the dependent current source gm may also be controlled to voltage resolution equal to or lower than the voltage DL without a change in voltage resolution. Through this control, it can be understood that, in a case where the driving current in the high current band is equal to or lower than 10 mA, the dependent current source gm is controlled to low voltage resolution.

As described above, the zoom control signal CZ is a signal for controlling the driving current in the low current band in such a manner to have high resolution, by performing control to achieve a wide range of voltages. The zoom control signal CZ may have a value that results from determining the current band of the driving current for light emission using the column data.

In addition, the voltage resolution of the sampling voltage, as described above, may be controlled by the zoom control signal CZ, and the driving current of the light-emitting diode channel in question for light emission may be controlled using the sampling voltage whose voltage resolution is controlled.

That is, it can be understood that, as the voltage resolution of the sampling voltage increases by the zoom control signal CZ, resolution for brightness, which can be represented by the driving current in the low current band, increases. More specifically, in a case where the voltage resolution increases by the zoom control signal CZ, the driving current may be controlled in a finer manner than in the case of low voltage resolution.

The zoom control signal CZ may be provided in a shared manner to all the light-emitting diode channels of the backlight board 40 or the light-emitting diode channels in the control group.

In addition, the zoom control signal CZ may be provided for each light-emitting diode channel of the backlight board 40 in such a manner as to have a value corresponding to the column data, that is, the column signal for each on a basis per horizontal period of the light-emitting diode channel.

Figures 11, 12:
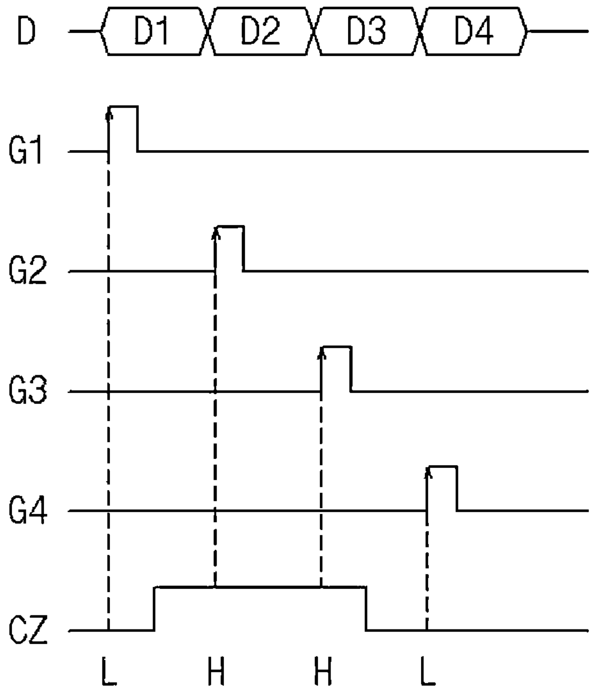
FIG. 11 is a waveform diagram that is referenced to describe the operation of the current control integrated circuit that uses the zoom control signal.
FIG. 12 is a table showing that the zoom control signal is provided for each light-emitting diode channel.

FIG. 11 is a waveform diagram that is referenced to describe the operation of the current control integrated circuit that uses the zoom control signal CZ.

With reference to FIG. 11, the value of the zoom control signal CZ may be determined to be "L" at a point in time at which the row signal G1 rises, and the logical LOW state "L" may apply to the zoom control signal CZ that is applied to the column data D1 for the horizontal period in question. Then, the value of the zoom control signal CZ may be determined to be "H" at a point in time at which the row signal G2 rises, and the logical HIGH state "H" may apply to the zoom control signal CZ that is applied to the column data D2 for the horizontal period in question. The value of the zoom control signal CZ may be determined to be "H" at a point in time at which the row signal G3 rises, and the logical HIGH state "H" may apply to the zoom control signal CZ that is applied to the column data D3 for the horizontal period in question. Then, the value of the zoom control signal CZ may be determined to be "L" at a point in time at which the row signal G4 rises, and the logical LOW state "L" may apply to the zoom control signal CZ that is applied to the column data D4 for the horizontal period in question.

That is, it is preferred that the controller 60 first provides the zoom control signal CZ for the period in question before the row signal is enabled.

FIG. 12 is a table showing that the zoom control signal CZ is provided for each light-emitting diode channel. From FIG. 12, it can be seen that the zoom control signal CZ, which corresponds to the light-emitting diode channels CH11, CH12, CH13, and CH14, corresponding to one period of the row signal G1, and to the light-emitting diode channels CH41, CH42, CH43, and CH44, corresponding to one period of the row signal G4, are all in logical LOW state "L." Furthermore, it can be seen that the zoom control signal CZ, which corresponds to the light-emitting diode channels CH21, CH22, CH23, and CH24, corresponding to one period of the row signal G2, and to the light-emitting diode channels CH31, CH32, CH33, and CH34, corresponding to one period of the row signal G3, are all in the logical HIGH state "H."

FIG. 12 illustrates that the controller 60 determines the current band of the driving current that corresponds to one period of the row signal using the column data for one horizontal period of the backlight. Furthermore, FIG. 12 illustrates that the controller 60 provides the zoom control signal CZ with the same value to the current control integrated circuits that correspond to all the control groups on a one-to-one basis, for one period of the row signal.

Figure 13:
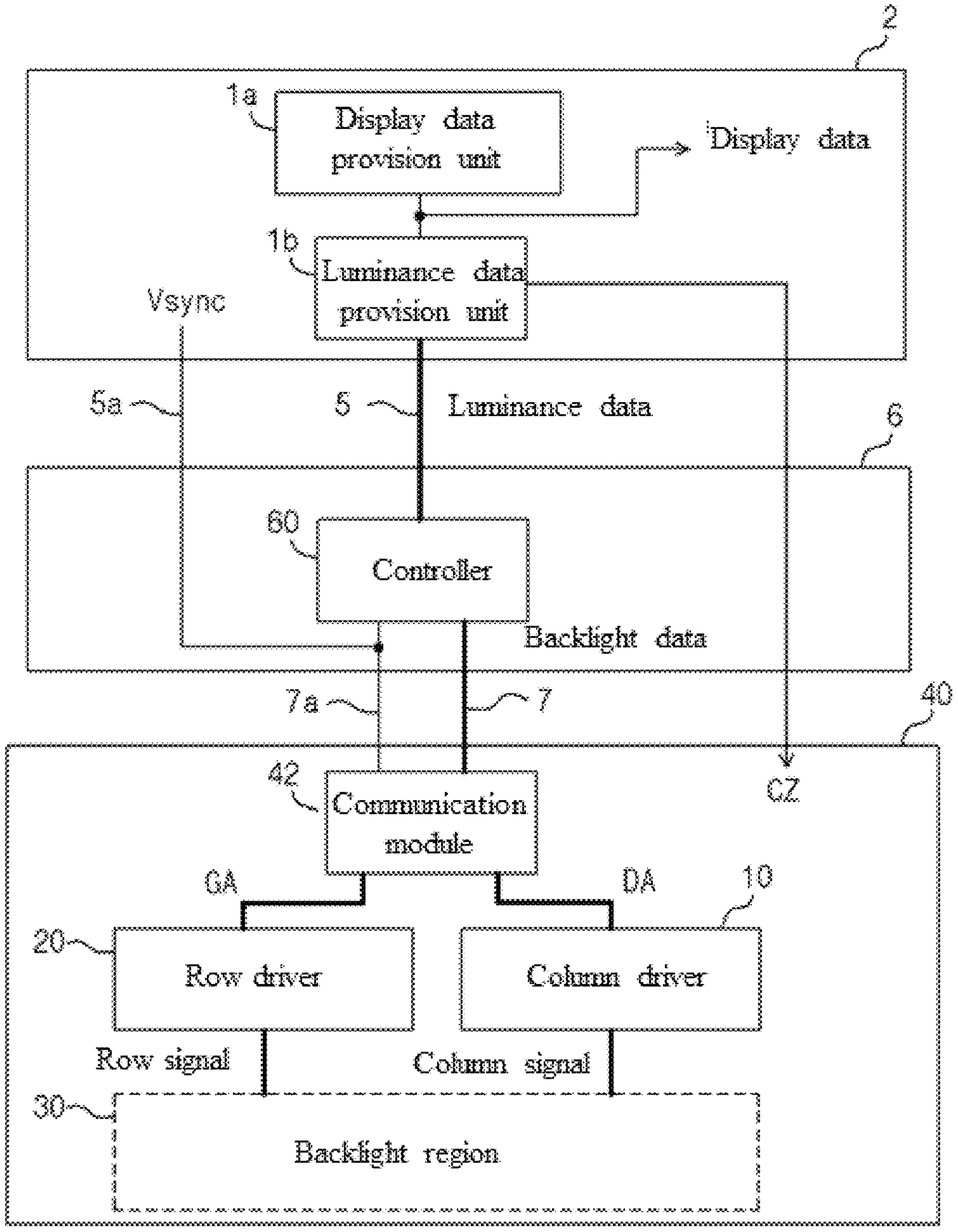
FIG. 13 is a block diagram illustrating another example of the interface among the display board, the backlight driving board, and the backlight board in FIG. 1.

FIG. 13 is a block diagram illustrating another example of the interface among the display board 2, the backlight driving board 6, and the backlight board 40. An embodiment in FIG. 13 is different from that in FIG. 2 in that the zoom control signal CZ is generated in the luminance data provision unit 1*b* of the display board 2 and that the zoom control signal CZ is provided to the backlight board 40 through a backlight driving board 6. The other constituent elements are the same as those in FIG. 3, and thus descriptions thereof are omitted.

FIG. 13 illustrates that the display board 2 generates and transmits the zoom control signal CZ that corresponds to one frame of the backlight.

In this case, the luminance data provision unit 1*b* of the display board 2 may generate the luminance data that results from converting the display data in such a manner as to have the resolution value and the gray value that correspond to the backlight and may generate the zoom control signal CZ using the luminance data. The luminance data here can be understood to correspond to the column data of the backlight driving board 6.

The above-described zoom control signal CZ may be transferred to the backlight driving board 6, in a state of being included in the luminance data, and then may be transferred to the backlight board 40, in a state of being included in the backlight data. Alternatively, the zoom control signal CZ may be transferred to the backlight board 40 through the backlight driving board 6 over the transmission line (not illustrated) separate from that for the luminance data.

In the configuration described above with reference to FIG. 13, in a case where the zoom control signal CZ is provided to the controller 60 of the backlight driving board 6, in a state of being included in the luminance data, the controller 60 may receive and store the column data, the row data, and the zoom control signal on a basis per one frame of the backlight. Then, the controller 60 may provide the zoom control signal CZ to the backlight board 40 on a per-horizontal period basis, in a manner that corresponds to the providing of the column data and the row data to the backlight board 40.

According to the present disclosure, with the above-mentioned configuration, the driving currents of the light-emitting diode channels can be controlled by the sampling voltage of the column signal in such a manner as to maintain light emission for one frame. Furthermore, the light emission from the light-emitting diode channels can be sufficiently maintained for the backlight, thereby reducing or eliminating flicker.

According to the present disclosure, the driving currents for light emission can be controlled on a per-control group basis, and the application of the current control integrated circuit can facilitate the design and manufacturing of the backlight board for controlling the driving currents of the light-emitting diode channels.

In addition, according to the present disclosure, there is provided an advantage in controlling the driving current in the low current band using a low gray range, such as a dark gray level, to higher resolution. Furthermore, there is provided an advantage in smoothly representing a difference in luminance in the low current band for the backlight.

In addition, according to the present disclosure, multi-functions enable amounts of good-quality light to be provided to LCD panels. Therefore, there is provided an advantage in securing high reliability.

The invention claimed is:

1. A backlight device for display, the device comprising:

a backlight driving board providing column data and row data for backlight and providing a zoom control signal that results from determining a current band of a driving current for light emission on a per-horizontal period basis as either a low current band, in which a preset reference amount of current is reached or is not reached, or a high current band, in which a maximum amount of current exceeds the preset reference amount of current, using the column data for one horizontal period; and a backlight board controlling the light emission for providing the backlight using the column data, the row data, and the zoom control signal, wherein the backlight driving board includes a controller that first provides the zoom control signal for the horizontal period before a row signal is enabled, wherein the backlight board comprises:

light-emitting diode channels arranged to have a plurality of columns and a plurality of rows, and divided into control groups, each including a predetermined number of adjacent light-emitting diodes sharing a column signal;

a column driver providing the column signal corresponding to the column data to the plurality of columns;

a row driver sequentially providing row signals corresponding to the row data to the plurality of rows; and current control integrated circuits configured in such a manner as to correspond to the control groups on a one-to-one basis, and wherein the current control integrated circuits:

include synchronization circuits that, by being synchronized with the row signals, provide synchronization zoom control signals corresponding to values of the zoom control signals input earlier than the row signals;

generate the synchronization zoom control signals at timings corresponding to the row signals that are input sequentially;

generate a sampling voltage that results from sequentially sampling the column signals using the row signals corresponding to the control group;

control the driving current for the light emission from the light-emitting diode channel using the sampling voltage; and control gains for conversion of the driving current by the sampling voltage on a per-horizontal period basis using the synchronization zoom control signal.

2. The backlight device of claim 1, wherein, in a manner that corresponds to a value of the column data, the controller provides the zoom control signal that results from determining the current band of the driving current as either the low current band or the high current band.

3. The backlight device of claim 2, wherein the controller provides the zoom control signal that results from determining the current band of the driving current corresponding to one period of the row signal using the column data for the horizontal period of the backlight.

4. The backlight device of claim 2, wherein, when at least one of the driving currents that correspond to the column data for the horizontal period of the backlight corresponds to the high current band, the controller outputs the zoom control signal that results from the determination as the high current band for the horizontal period.

5. The backlight device of claim 2, wherein, when all the driving currents that correspond to the column data for the horizontal period of the backlight correspond to the low current band, the controller outputs the zoom control signal that results from the determination as the low current band for the horizontal period.

6. The backlight device of claim 2, wherein the controller:

receives and stores the column data and the row data that correspond to one frame of the backlight;

stores the zoom control signal that results from determining the current band on a per-horizontal period basis; and provides the zoom control signal to the backlight board on a per-horizontal period basis in a manner that corresponds to the providing of the column data and the row data to the backlight board.

7. The backlight device of claim 2, further comprising:

a display board generating the column data and the row data that correspond to one frame of the backlight, and the zoom control signal using display data, wherein the controller:

receives and stores the column data, the row data, and the zoom control signal on a basis per one frame of the backlight; and providing the zoom control signal to the backlight board on a per-horizontal period basis in a manner that corresponds to the providing of the column data and the row data to the backlight board.

8. The backlight device of claim 1, wherein each of the current control integrated circuits controls the driving current on the low side of the light-emitting diode channel.

9. The backlight device of claim 1, wherein each of the current control integrated circuits includes a plurality of driving current control units, wherein the plurality of driving current control units receive the column signal for the control group and the zoom control signal in a shared manner and sequentially receive the row signals, respectively, and wherein each of the plurality of driving current control units:

generates the sampling voltage that results from sampling the column signal using the row signal;

controls the driving current for the light emission from the light-emitting diode channel using the sampling voltage; and generates the synchronization zoom control signal, which results from determining a value of the zoom control signal, by being synchronized with the row signal, thereby enabling the gain for conversion of the driving current by the sampling voltage to be controlled with the value of the synchronization zoom control signal.

10. The backlight device of claim 9, wherein each of the driving current control units comprises:

a holding circuit generating the sampling voltage that results from the column signal using the row signal, and maintaining the sampling voltage; and a channel current control unit controlling the driving current using the sampling voltage, thereby enabling the gain for conversion of the driving current by the sampling voltage to be controlled with the synchronization zoom control signal.

11. The backlight device of claim 10, wherein the channel current control unit comprising:

a dependent current source receiving the sampling voltage and controlling an amount of the driving current according to the sampling voltage, wherein the dependent current source is such that the gain is controlled according to a level of the synchronization zoom control signal.

12. The backlight device of claim 9, wherein the zoom control signal is provided on a per-horizontal period basis in such a manner as to have a first logical level according to which the current band of the driving current is determined as the low current band or to have a second logical level according to which the current band of the driving current is determined as the high current band, and wherein the driving current control unit controls the gain in such a manner as to have a first gain value for high resolution, using the synchronization zoom control signal that corresponds to the zoom control signal having the first logical level, and controls the gain in such a manner as to have a second gain value for low resolution, using the synchronization zoom control signal that corresponds to the zoom control signal having the second logical level.

13. A current control integrated circuit comprising:

a plurality of driving current control units sharing a column signal for backlight and controlling driving currents of a predetermined number of light-emitting diode channels belonging to the same control group, wherein the plurality of driving current control units include synchronization circuits that receive the column signals for the control group and zoom control signals in a shared manner, sequentially receive row signals, and generate synchronization zoom control signals, and wherein each of the plurality of driving current control units:

receive the zoom control signal that results from determining a current band of a driving current for light emission on a per-horizontal period basis as either a low current band, in which a preset reference amount of current is reached or is not reached, or a high current band, in which a maximum amount of current exceeds the preset reference amount of current, using column data for one horizontal period;

first receives the zoom control signal for the horizontal period before the row signal is enabled;

generates a sampling voltage that results from sampling the column signal using the row signal;

controls the driving current for the light emission from the light-emitting diode channel using the sampling voltage; and generates the synchronization zoom control signal at a timing corresponding to each of the row signals that correspond to values of the zoom control signals that are input earlier than the row signals and are input sequentially, by being synchronized with the row signal by the synchronization circuit, thereby enabling a gain for conversion of the driving current by the sampling voltage to be controlled with a value of the synchronization zoom control signal.

14. The current control integrated circuit of claim 13, wherein the zoom control signal has a value that results from determining the current band of the driving current corresponding to one period of the row signal using the column data for a horizontal period.

15. The current control integrated circuit of claim 13, wherein, when at least one of the driving currents for a horizontal period of the backlight corresponds to the high current band, the zoom control signal has a value that results from the determination as the high current band for the horizontal period.

16. The current control integrated circuit of claim 13, wherein, when all the driving currents for a horizontal period of the backlight correspond to the low current band, the zoom control signal has a value that results from the determination as the low current band for the horizontal period.

17. The current control integrated circuit of claim 13, wherein each of the driving current control units comprises:

a holding circuit generating the sampling voltage that results from the column signal using the row signal, and maintaining the sampling voltage; and a channel current control unit controlling the driving current using the sampling voltage, thereby enabling the gain for conversion of the driving current by the sampling voltage to be controlled with the synchronization zoom control signal.

18. The current control integrated circuit of claim 17, wherein the channel current control unit comprising:

a dependent current source receiving the sampling voltage and controlling an amount of the driving current according to the sampling voltage, wherein the dependent current source is such that the gain is controlled according to a level of the synchronization zoom control signal.

19. The current control integrated circuit of claim 13, wherein the zoom control signal is provided in such a manner as to have a first logical level according to which the current band of the driving current is determined as the low current band or to have a second logical level according to which the current band of the driving current is determined as the high current band, and wherein the driving current control unit controls the gain in such a manner as to have a first gain value for high resolution, in a manner that corresponds to the synchronization zoom control signal having the first logical level, and controls the gain in such a manner as to have a second gain value for low resolution, in a manner that corresponds to the synchronization zoom control signal having the second logical level.

* * * * *